United States Patent [19]
Schandl et al.

[11] Patent Number: 5,313,345
[45] Date of Patent: May 17, 1994

[54] SYSTEM FOR ADJUSTING TENSION IN A TAPE

[75] Inventors: Hartmut Schandl, Wien; Fritz Weisser, St. Georgen, both of Fed. Rep. of Germany

[73] Assignee: Deutsche Thomson-Brandt GmbH, Villingen-Schwenningen, Fed. Rep. of Germany

[21] Appl. No.: 903,676

[22] Filed: Jun. 24, 1992

Related U.S. Application Data

[63] Continuation of PCT/EP90/01995, Nov. 22, 1990.

[30] Foreign Application Priority Data

Nov. 30, 1989 [DE] Fed. Rep. of Germany ....... 3939521

[51] Int. Cl.$^5$ .............................................. G11B 15/48
[52] U.S. Cl. ................................ 360/74.1; 360/73.14; 360/96.3
[58] Field of Search ................. 360/73.04, 73.14, 74.1, 360/96.3; 242/200, 201

[56] References Cited

U.S. PATENT DOCUMENTS

| | | | |
|---|---|---|---|
| 4,510,534 | 4/1985 | Maeda | 360/10.3 |
| 4,649,441 | 3/1987 | Louth | 360/73.14 X |
| 4,706,139 | 11/1987 | Maeda | 360/71 |
| 4,786,992 | 11/1988 | Tajima et al. | 360/73.14 X |
| 4,801,853 | 1/1989 | Lewis et al. | 318/7 |
| 4,945,426 | 4/1990 | Okamoto et al. | 360/73.14 X |

FOREIGN PATENT DOCUMENTS 0240437 10/1987 European Pat. Off. .
3939521 6/1991 Fed. Rep. of Germany .
57-78662 5/1982 Japan .
2094542 9/1982 United Kingdom .

OTHER PUBLICATIONS

The Art of Electronics, Horowitz & Hill 1983 UK & US pp. 598,599.
Telefunken Data Book 1976 p. 225 CNY36, CNY37 Opto Couplers.
Digi-Key Catalog 1993 pp. 91 & 94, Opto Isolators.
SGS Data Book 1987 pp. 75-79. Power Operational Amplifier Fig. 9 shows motor drive.
Kybott "Video Tape Recorders" 1978 pp. 102-103 especially Figure 6-32.

Primary Examiner—Aristotelis Psitos
Assistant Examiner—James T. Wilson
Attorney, Agent, or Firm—Joseph S. Tripoli; Joseph J. Laks; Francis A. Davenport

[57] ABSTRACT

A system for adjusting the tension of a tape in a magnetic tape record/playback device includes a feed spool, a take-up spool and a motor for feeding the tape between the spools in a forward direction and a reverse direction. A tension sensor senses the tension in the tape as the tape is fed in the forward direction. The tension sensor is locked in its last existing position when the tape direction is changed from the forward direction to the reverse direction. A slip coupling applies a preadjusted tension to the tape when the tape is fed in the reverse direction.

4 Claims, 3 Drawing Sheets

SYSTEM FOR ADJUSTING TENSION IN A TAPE

This application claims benefit under 35 U.S.C. §120 of PCT application PCT/EP 90/01995 filed Nov. 22, 1990 by Hartmut Schandl and Fritz Weisser and titled "Process For Adjusting the Tension In A Tape".

BACKGROUND OF THE INVENTION

Video and audio recorders store the information on magnetic tape which is stored in a cassette having two adjacent winding reels. The cassette is inserted into the playback device in such a way that the winding reels are actuated by gravity to lock in with suitable gudgeons of the drive mechanism of the playback device. With off-the-shelf video recorders having a rotating head cylinder it is necessary to draw the magnetic tape out of the cassette by means of a 'threading' mechanism and, with the help of guides, to place the tape against the perimeter of the head cylinder. This threading process is performed by means of a threading motor which places the magnetic tape into its playing position, for example, by means of threading carriages driven by means of a cam disc.

A capstan motor drives the winding reel through a tumbler gear which is coupled to a take-off reel. In the playback mode of operation the required tape tension is maintained at a feeding reel by a friction brake which is designed as a brake band. In order to maintain uniform tape tension throughout the entire length of the tape, the actual tape tension is monitored by a tape tension sensor and evaluated to adjust the braking effect on the feeding reel dependent upon the position of the sensor.

With existing playback/record devices the brake band must be released during the search mode when tape motion is reversed because the brake band would tighten itself at the take-up reel. The release of the brake band typically is accomplished by lifting the tape tension sensor off of the magnetic tape. The existing adjusted tape tension is then lost and a loop develops in the tape. This loop must be taken up when the magnetic tape is started. Accordingly, with the existing playback/record devices it is difficult to feed a single frame for a still picture display when the direction of the magnetic tape is changed from the forward direction play mode to the backward direction search mode.

In the backward search mode the mechanical brake band has no effect and a definite given value of the tape tension needed for good tape-head contact must be obtained by the slip coupling. However, because the tape winding diameters change, an increase in the tape tension by a factor of as much as four can occur over the full length of the tape. Thus, periods of excessive tension will over stretch the magnetic tape and result in increased wear.

SUMMARY OF THE INVENTION

In a magnetic recorder described in DE 3935 150, the winding reels are driven through a tumbler gear. The tumbler gear is driven by a planetary gear having an integrated slip coupling, the effects of which are adjustable. Definite values for the slip coupling are set for the various types of operation in this recorder.

The invention provides a magnetic tape wind/rewind mechanism which in the reverse search mode maintains the last existing tape position and tension level and which, in the playback mode of operation, regulates the tape tension to a consistent value throughout the magnetic tape length.

With the invention, the last existing adjusted tape position and tension are maintained when the tape is reversed into the backward or reverse search mode by first locking a tape tension-sensor-lever in its last position. Such tension-sensor-lever locking is accomplished with a catch lever which is released by the threading motor. The catch lever has a fixed pivot point and a crank arm makes contact with the tape tension-sensor-lever through the use of a spring. The catch lever engages a specially shaped surface of the tape tension-sensor-lever and the tape tension-sensor-lever and the brake band, which is coupled with the tape tension-sensor-lever, are held in their respective positions at a take-off plate or supply reel platter.

Good tape-head contact in the backward search mode requires a larger transmission moment than is needed during the normal reproduction mode because of the longer tape distance between the driving capstan shaft and the driven winding reel. This means that the tape tension is also higher in the backward search mode of operation. The transmission moment is adjusted by a slip coupling which is located in the driving path. The slip coupling can be located, for example, in a set of gears, as described in the above mentioned DE 3935 150. At the start of the backward search mode the tape tension-sensor-lever is in contact with the magnetic tape and tape tension is increased by the take-off or supply reel being driven via the tumbler gear and the slip coupling. This increased tape tension moves the tape tension-sensor-lever in the direction in which the break band of the supply reel, which now operates as the take-up reel, is released. The tightly stretched magnetic tape results in an excursion of the tape tension-sensor-lever, this is possible despite the closed catch lever because the surface on which the catch lever makes contact is formed in such a way that the catch lever can glide on this surface. The tape tension sensor lever eventually reaches a position where the catch lever no longer makes contact. Thereby, the tape tension-sensor-lever still lies on the magnetic tape and is free to follow the excursions of the magnetic tape.

In order to maintain a consistent tape tension as the entire length of the tape is wound, the excursions of the tape tension-sensor-lever can be used for control adjustment of the slip coupling. The particular position of the tape tension-sensor-lever is detected by sensors, for example, in the form of a light slot type of opto-coupler. The tape tension-sensor-lever has a part specially-formed as a light barrier, which is inserted into the light slot where it is illuminated. The excursions of the tape tension-sensor-lever vary the position of the light barrier in the light slot which varies the illumination. Control signals are produced by the sensors responsive to the position of the light barrier. The control signals are coupled to an electronic control circuit which controls an electro-mechanical converter, for regulating the coupling effect produced by the slip coupling. The electro-mechanical converter can be the threading motor which is coupled to the slip coupling with the adjustable coupling produced via a lever arrangement. Mechanical, magnetic (Hall elements) or optical elements can be installed as the sensors. The use of sensors already existing within the device is particularly advantageous. Therefore, for example, those sensors can be used which are provided for the operation mode detection of the tape drive which in the prior art have no function in the backward search mode.

Another technique of adjusting the slip coupling effect to maintain a constant tape tension is to determine the diameters of the take-up and take-off reels by measurement of the rotational speeds and to generate control voltages for the electro-mechanical converter from the relationship between the diameters. A microprocessor which exists in present-day magnetic tape recorders can be used to make the calculations. However, this type of coupling regulation can only be seen as a control process whereas the described coupling regulation via sensors, which detect the position of the tape tension sensor lever, constitutes a regulating process in the form of a closed regulating loop.

DETAILED DESCRIPTION

Figure 1:
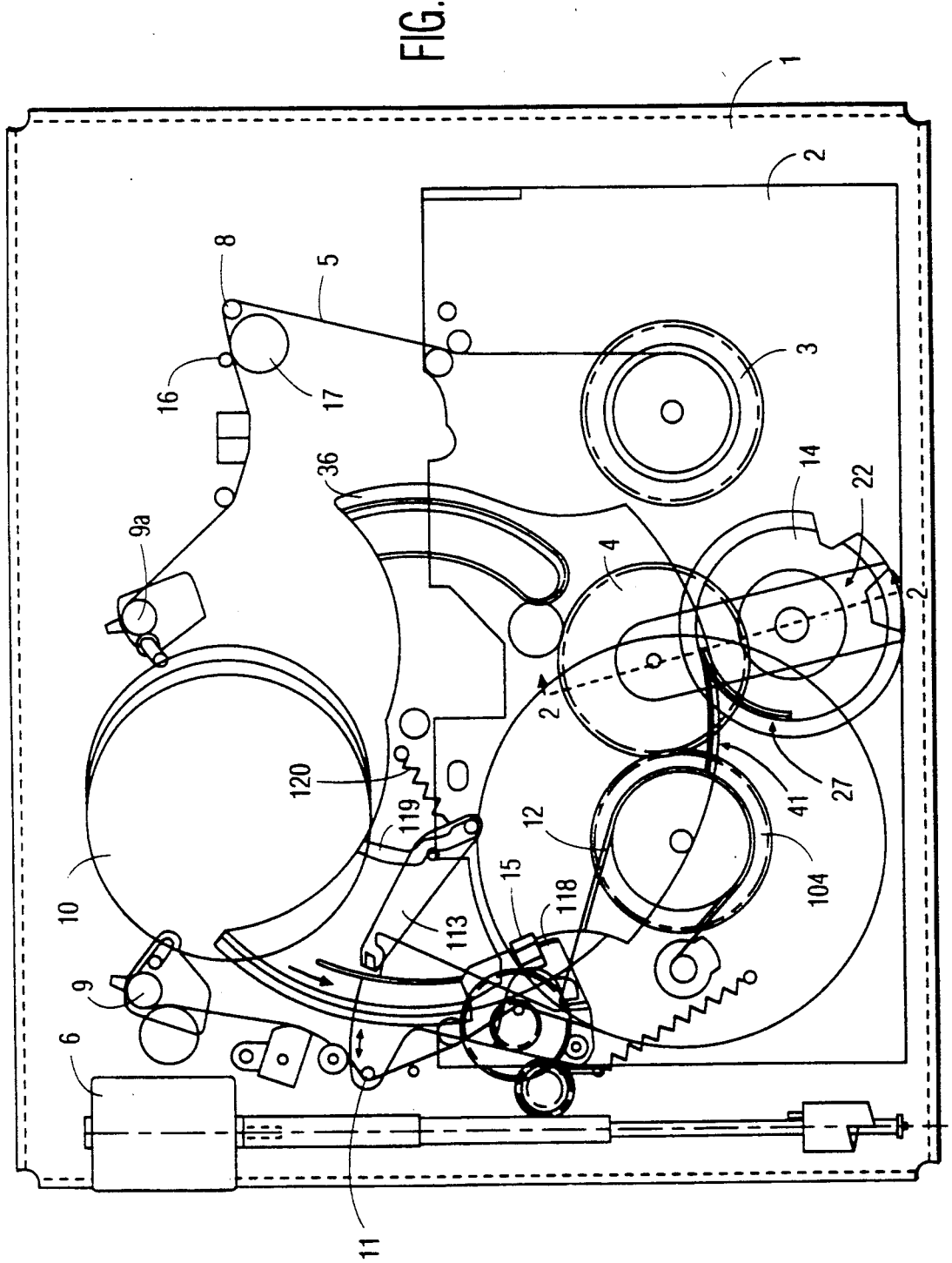
FIG. 1 is a plan view of a preferred embodiment of a tape drive chassis for a video recorder.
Figure 4:
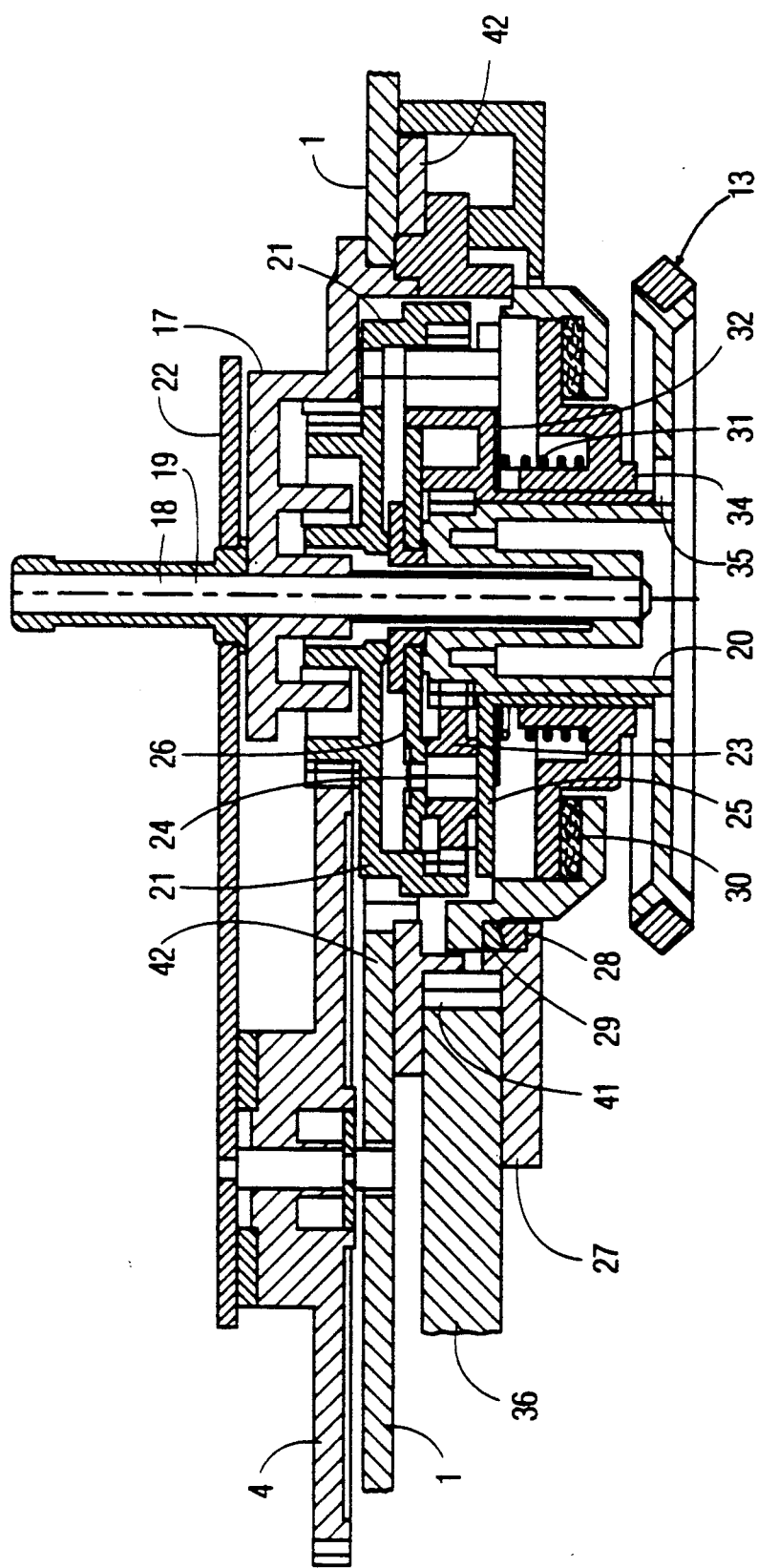
FIG. 4 is a cross section through planet gear 14 at section line 2 in FIG. 1.

FIG. 1 shows a plan view of a tape drive chassis 1 for a video recorder loaded with a magnetic tape cassette 2. The magnetic tape 5 is drawn out from the cassette 2 by the threading motor 6 via the threading elements 8, 9 and 9a by means of guides, which are not illustrated, and arranged around a head cylinder 10. The capstan motor is located outside the cassette 2. The capstan motor shaft 16 drives the magnetic tape 5 in cooperation with a rubber capstan idler (RI roll) 17. The capstan motor shaft also drives, via a rubber belt 13, a set of planetary gears 14, as shown in FIG. 4 and described later. The gears 14 are engaged with the take-off reel or feed spool 104, via the tumbler gear 4, as shown in FIG. 1. The operating mode 'search backwards' is predetermined because the magnetic tape 5 is driven by the RI roll 17 as shown in FIG. 1. The tape tension-sensor-lever 11 also makes contact with the magnetic tape 5 in the search mode of operation. However, the brake band 12 is controllable through the tape tension-sensor-lever 11 and is removed from contact with the take-off reel 104, which serves as the take-up reel in the search mode of operation. In the backwards search mode of operation catch lever 113, which maintained the position of the tape tension-sensor-lever 11, no longer functions because the tape tension-sensor-lever 11 is moved far to the right, as viewed in the direction of the arrow. With the tape tension-sensor-lever 11, moved far to the right, light barrier 118, which is attached to the tape tension-sensor-lever is illuminated by insertion into sensor 15, which preferably is a light slot type of opto-coupler. The particular position of the tape tension-sensor-lever 11 is detected by the degree of insertion of barrier 118 into the light slot of sensor 15, as indicated by the arrows on light barrier 118 of FIG. 2, and is converted into electrical signals that are used to control a slip coupling which is included within the set of gears 14. The gear set 14 and slip coupling serve to adjust the tape tension in the backwards search mode of operation. The slip coupling is adjusted via lever surfaces 28 and 29 shown in FIG. 4, driven by the threading motor 6 to which the control signals are fed via a control circuit 121.

In the playing and recording modes of operation the tumbler gear 4 is engaged with the take-up reel or spool 3 by the cam disc 36. The cam disc 36 can be rotated by the threading motor 6 in the direction of the arrow and since the catch lever 113 is guided in a groove 119, until it is removed from contact with the cam disc 36 and the catch lever 113 does not come into contact with the tape tension-sensor-lever 11. The tape tension-sensor-lever 11 is moved further to the left, as viewed in the direction of the arrow, in play and record modes of operation because a relatively small tape tension exists.

When the direction of rotation changes along with a change in the mode of operation, from either the play or the record mode, to the search mode of operation the cam disc 36 rotates to reach the final position shown in FIG. 1 by engaging the tumbler gear 4 with the winding reel 104 and the catch lever 113 is released by the groove 119 so far that the spring 120 forces the catch lever 113 against the oblique-shaped surface of the tape tension sensor lever 11. Accordingly, the last existing position of the tape tension sensor lever 11 is firmly maintained during the change in rotation direction. The brake band 12 also maintains the adjusted effect. The tape tension is initially increased by starting the capstan motor, which is coupled via the slip coupling and the tumbler gear 4, driving the winding reel 104. Winding reel 104, increases the tension on the tape 5, causing the tape tension-sensor-lever 11, to move to the right, as viewed in the direction of the arrow. This process brings the catch lever 113 into a functionless state because of the particular form of the supporting area of the tape tension-sensor-lever 11. The brake band 12 is removed from contact with the winding reel 104. The control of the tape tension is then assumed by the slip coupling housed within in the set of planetary gears 14.

FIG. 4 is a cross section at section line 2 of FIG. 1, showing the planetary gear 14, incorporating a slip coupling. The planet gear is affixed to the chassis 1 through a holder block 17. The center axis 18, of axle 19, serves as the rotational axis for a sun wheel 20 and for bell wheel 21, which drives the tumbler gear 4. The tumbler gear 4, is rotatably mounted on a tumbler gear lever 22.

The transmission of the turning moment is performed by planet wheels 23 (gears) which mesh the sun wheel 20 and the bell wheel 21. The planet wheels 23 are rotatable on shafts 24. The planet wheels 23 are also rotatably supported in an upper planet carrier 26 and a lower planet carrier 25. The planet carriers 25, 26 are equiangularily spaced about the gearing axis 18 and can perform an auto-rotation around this axis.

The planet carrier 26 has a fixed height in a direction parallel to axis 18. The height of the lower planet carrier 25 is adjustable in a direction parallel to axis 18. The height adjustment occurs through a lever 27 which is slidable, by means of the threading motor 6 and a ramp 28 which acts upon a non-rotatable control ring 29 having an adjustable height. A ring of felt 30, which serves as the clutch facing for the slip coupling is arranged between the height adjustable control ring 29, which forms part of the coupling, and the lower planet carrier 25. The contact pressure for the coupling is applied by a concentric pressure spring 31, which operates between the lower planet carrier 25 and a metal ring 32. The metal ring 32 rests on a step provided in the planet wheel shaft 24.

A predetermined speed of the winding reels for the "play operation" is obtained because the planet gear 15 has a step down between the sun drive 20 and the side of the tumbler gear 4. In the tape winding mode, a higher speed is desirable and this is obtained by eliminating the speed reduction effects of the planet gear. To this end, the lower planet wheel ring 25 can be lowered by lever 27 and the height adjustable control ring 29, which is secured against auto rotation by means of a stopping nose 33 (not shown in FIG. 4), and the nubs 34 which enter the recesses 35 of the sun drive 20. The planet wheels 23 are then driven at the speed of the sun drive 20 and the planet wheels 23 transmit this speed to the bell wheel 21. The elimination of the use of the planet gear can also be utilized when a change of operating mode requires reversal of the winding drive direction.

It is possible to swing the tumbler gear 4 from one winding reel to the other without changing the tape tension while the tape 5 is not "threaded in" and the RI roll 17 is lifted off the tape. However, for high quality recorders with single picture presentation this type of rotation reversal is not practicable. The lifting off of the RI roll 17 and the swinging of the tumbler gear 4 make it difficult to maintain the position of the last shown picture with certainty. For this reason, with high quality recorders the reversal of the rotation direction is controlled by the threading motor 6 via the cam disc 36 whilst maintaining the RI roll 17 in contact with the tape and capstan shaft.

Figure 2:
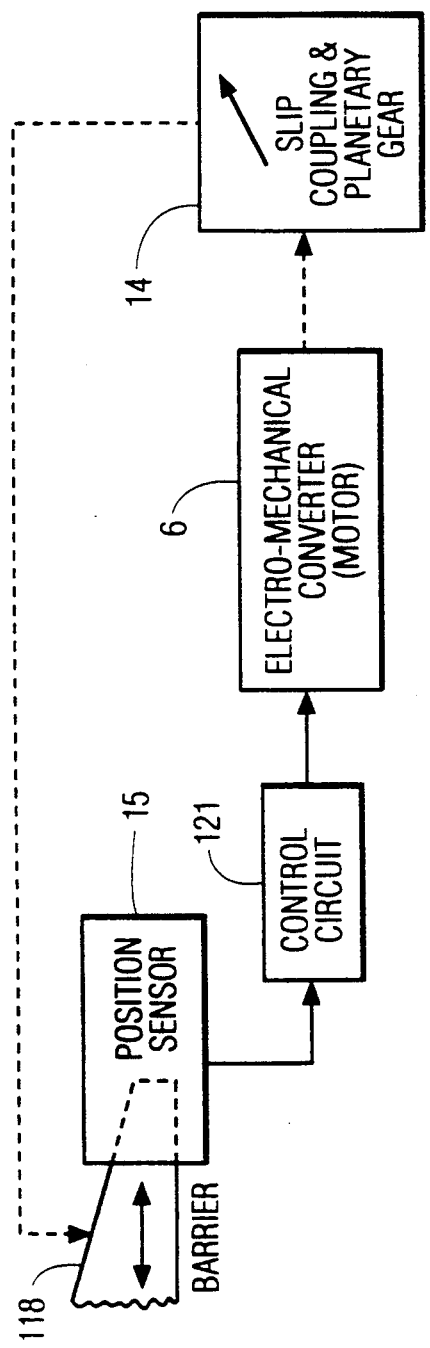
FIG. 2 is a block circuit diagram for the coupling adjustment by means of an electromagnetic converter.

FIG. 2 is a block diagram of a slip coupling adjustment control loop using an electro-mechanical converter or motor 6. The tape tension sensor lever 11 has a specially-formed part 118 which for example, when the sensor 15 is a slot type opto-coupler, may be formed as a light barrier which can be a transparent foil marked with lines formed as a light barrier. In the backward search operating mode the light barrier 118 is variably inserted into the illuminated slot of sensor 15, as depicted by the arrows on element 118. Sensor 15 may for example, utilize a Hall effect magnetic element to sense the mechanical position of part 118 relative to a fixed point, as shown FIG. 2, then a particular shape of the part 118 is satisfactory, as shown in FIG. 2.

Position signals are generated by the sensor 15 responsive to the varying position of part 118 in the sensor slot. The position signals, namely voltages at the sensor output, are converted into control signals in a control circuit 121. The control signals drive electro-mechanical converter or motor 6. In the preferred embodiment of FIG. 2, the converter 6 is the existing threading motor 6 already provided in the device. The threading motor 6 is connected via a lever arrangement, (28 and 29 shown in FIG. 4) and depicted as a broken line, to the adjustable slip coupling within the set of planetary gears 14. Thus threading motor 6 sets the tape tension by adjusting the slip coupling effect according to setting given by the sensor 15. The dotted line between the set of planetary gears 14 and barrier 118 of the tape tension sensor lever 11 represents the regulated tension in the tape resulting from adjustment of the slip coupling. This sort of control is a closed regulation loop through which the tape tension throughout the entire length of the magnetic tape can be sensitively held at an approximately constant value.

Figure 3:
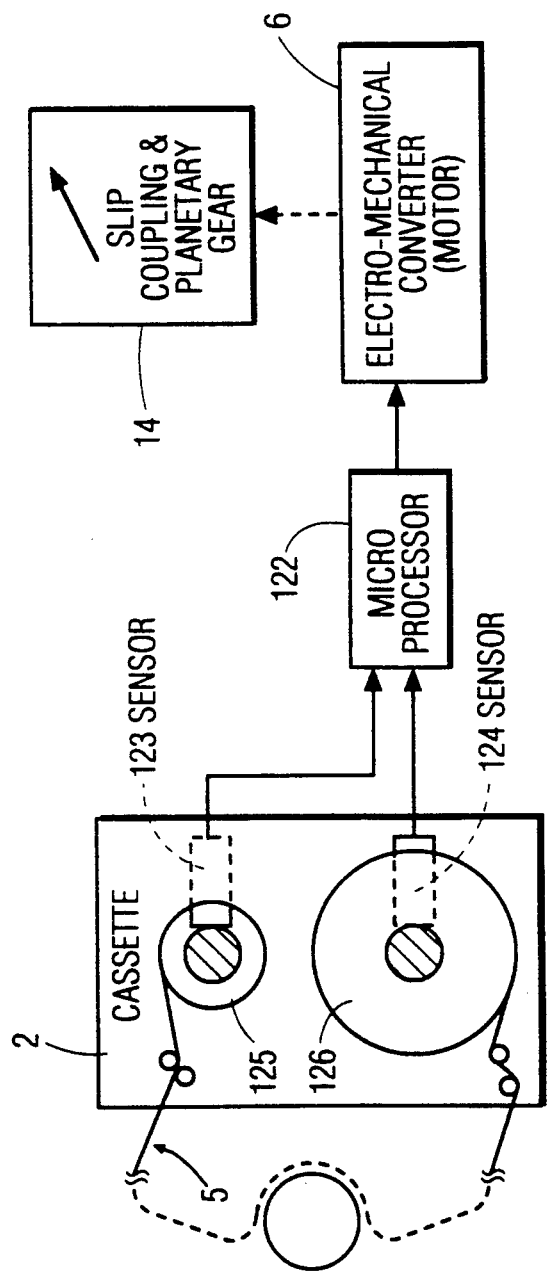
FIG. 3 shows the adjustment of the coupling effect dependent on the tape winding diameters.

FIG. 3 shows a method for controlling the adjustment of the slip coupling provided by planetary gears 14, using the tape winding diameters as a control parameter. In cassette 2 the rotational speeds of the tape reels will change as tape pack winding diameters 125, 126 change. The rotational speeds of the tape reels are detected by means of sensors 123 and 124 which operate in a well known manner. The sensors 123 and 124 generate signals related to the rotational speeds of tape pack 125 and 126, these are coupled to a microprocessor 122, which calculates therefrom, the tape pack winding diameters. The relationship between the diameters is further processed by microprocessor 122 using known hardware and software techniques to generate a control voltage. The control voltage is fed to the electronic converter 6, which for example, may comprise the threading motor 11. Electronic converter 6 is coupled, as depicted by the dotted line and as described earlier, to controllably adjust the slip coupling within the set of planetary gears 14.

We claim:

1. A system for adjusting the tension of a tape in a magnetic tape record/playback device comprising:
   a feed spool, a take-up spool and a motor for feeding said tape between said spools in a forward direction or a reverse direction;
   tension sensing means for sensing the tension in said tape as said tape is fed in said forward or reverse direction;
   means for maintaining said tension at a predetermined value when said tape direction is changed from said forward direction to said reverse direction;
   a gear set having a slip coupling;
   said slip coupling for applying a desired tape tension to said tape; and
   an electro-mechanical converter means coupled to said slip coupling to control a slip coupling effect responsive to said sensed tension to produce said desired tape tension when said tape is fed in said reverse direction.

2. The system of claim 1 further including a brake band for applying tension to said tape as said tape is fed in said forward direction; and means for releasing said brake band when the direction is changed from said forward direction to said reverse direction.

3. The system of claim 1 further including means for sensing motion of said tension sensing means; and further including an control circuit responsive to said means for sensing for providing control signals to said electro-mechanical converter for controlling the tension applied by said slip coupling.

4. The system of claim 1 further including means for sensing the diameters of the tape on said feed spool and said take-up spool; and further including an microprocessor circuit for providing control signals to said electro-mechanical converter in accordance with the ratio of said diameters for controlling the tension applied by said slip coupling.

* * * * *